United States Patent [19]
Fukumoto et al.

[11] Patent Number: 5,886,097
[45] Date of Patent: Mar. 23, 1999

[54] HOUSING AND RESIN COMPOSITION INCLUDING POLYETHER ESTER AMIDE, THERMOPLASTIC RESIN, VINYL POLYMER AND HALOGEN

[75] Inventors: Tadao Fukumoto, Tsushima; Masatoshi Iwamoto; Akihiko Kishimoto, both of Nagoya, all of Japan

[73] Assignee: Toray Industries, Inc., Japan

[21] Appl. No.: 932,286

[22] Filed: Sep. 17, 1997

Related U.S. Application Data

[60] Continuation of Ser. No. 595,644, Feb. 2, 1996, abandoned, which is a division of Ser. No. 240,270, May 10, 1994, Pat. No. 5,500,478, which is a division of Ser. No. 980,106, Nov. 23, 1992, Pat. No. 5,338,795, which is a continuation of Ser. No. 747,469, Aug. 13, 1991, abandoned, which is a continuation of Ser. No. 295,239, Jan. 9, 1989, abandoned, which is a division of Ser. No. 36,088, Apr. 9, 1987, abandoned.

[30]  Foreign Application Priority Data

Apr. 14, 1986  [JP]  Japan .................................. 61-84338
May 20, 1986  [JP]  Japan ................................ 61-115528
May 14, 1986  [JP]  Japan ................................ 61-108503

[51] Int. Cl.[6] ..................................................... C08L 53/00
[52] U.S. Cl. ............................. 525/66; 524/504; 524/505; 524/508; 524/514; 525/92 A; 525/133; 525/148; 525/167
[58] Field of Search ................................... 525/92 A, 133, 525/167, 148, 66; 524/504, 505, 508, 514

[56]  References Cited

U.S. PATENT DOCUMENTS 4,683,255  7/1987  Sugio et al. ............................. 524/151
5,616,418  4/1997  Vasselin et al. ..................... 428/474.7

FOREIGN PATENT DOCUMENTS 61-73753  4/1986  Japan .

*Primary Examiner*—Ana Woodward
*Attorney, Agent, or Firm*—Austin R. Miller

[57]  ABSTRACT

Thermoplastic resin compositions consisting of 1 to 40 wt % a polyether ester amide (A) and 99 to 60 wt % of at least one thermoplastic resin (B) selected from styrene based resins, further containing (C) 0.1–10% of a modified vinyl polymer containing carboxyl groups, are permanently antistatic, excellent in mechanical properties represented by impact resistance, heat resistance moldability and also in the appearance and gloss of the moldings, and suitable for housings of optical or magnetic recording media.

13 Claims, No Drawings

HOUSING AND RESIN COMPOSITION INCLUDING POLYETHER ESTER AMIDE, THERMOPLASTIC RESIN, VINYL POLYMER AND HALOGEN

This application is a continuation of application Ser. No. 08/595,644, filed on Feb. 2, 1996, now abandoned which is a divisional of Ser. No. 08/240,270 filed May 10, 1994, now U.S. Pat. No. 5,500,478, which is a divisional of Ser. No. 07/980,106, filed Nov. 23, 1992, now U.S. Pat. No. 5,338,795, which is a continuation of Ser. No. 07/747,469 filed Aug. 13, 1991, now abandoned which is a continuation of Ser. No. 07/295,239 filed Jan. 9, 1989, now abandoned which is a divisional of application Ser. No. 07/036,088 filed Apr. 9, 1987 now abandoned.

BACKGROUND OF THE INVENTION

Synthetic polymeric materials are being used in extensive areas because of their excellent properties. If provided with antistatic capability in addition to the mechanical properties peculiar to them, these materials can find more areas of application. That is, they can be used for parts of electronic and electric machines such as copiers and television sets desired to be free from electrostatic trouble, parts of various dustproof apparatuses, their housings, etc.

Synthetic polymeric materials have been generally provided with the antistatic property (1) by kneading a water absorbable compound such as polyalkylene oxide, antistatic agent, etc. with the polymer concerned, or (2) by coating the polymer on the surface with a surfactant, etc. Either method fails to provide a satisfactory antistatic property, and cannot avoid such problems that rinsing or surface wiping decreases the antistatic capability, or that the ingredient containing bleeds out onto the surface, to degrade the quality of the material, and that the antistatic property is degraded by secular change.

These problems have not been solved so far. In this situation, the inventors studied intensively for the purpose of developing intrinsically antistatic resins with permanent antistatic capability, and as a result found that said purpose can be efficiently achieved by mixing certain polyether ester amide with at least one thermoplastic resin selected from styrene based resins, polyphenylene ether resins and polycarbonate resins in specific proportions. Thus, the present invention has been completed.

Compositions similar to those of the present invention include those disclosed in EP167824 (A) which are prepared by adding a polyamide elastomer to a styrene based resin and/or a polyphenylene ether to enhance the wear resistance of the styrene based resin.

EP167824 is intended to enhance the wear resistance of styrene based resins, and does not refer to any description nor suggestion concerning their permanent antistatic property.

SUMMARY OF THE INVENTION

An object of the present invention is to provide intrinsically antistatic resins excellent in antistatic property, mechanical properties represented by impact resistance, weld strength, heat resistance, moldability and also in the appearance and gloss of moldings.

Another object of the present invention is to provide intrinsically antistatic resins excellent in the prevention of layer exfoliation and mold corrosion.

A further object of the present invention is to provide resins suitable for housings of optical and magnetic recording media.

The intrinsically antistatic resin compositions of the present invention are composed of 1 to 40 wt % of (A) a polyether ester amide and 99 to 60 wt % of (B) at least one thermoplastic resin selected from styrene based resins, polyphenylene ether resins and polycarbonate and (c) 0.1–20 wt % of a vinyl polymer containing carboxyl groups. The weight % is based on the weight of the entire composition.

DETAILED DESCRIPTION OF THE PREFERRED EMBODIMENTS (A) Polyether Ester Amide

The polyether ester amide (A) as a component of the present invention can be selected from block or graft copolymers obtained by letting a polyamide forming ingredient react with a poly(alkylene oxide) glycol and a dicarboxylic acid.

Components of preferable polyether ester amides (A) in the present invention include the following. The polyamide forming ingredient can be selected from amino carboxylic acids with 6 or more carbon atoms, lactams and diamine-dicarboxylates. The aminocarboxylic acids include ω-aminocaproic acid, ω-aminoenanthic acid, ω-aminocaprylic acid, ω-aminopelargonic acid, ω-aminocapric acid, 11-aminoundecanoic acid, 12-aminododecanoic acid, etc. The lactams include caprolactam, enantholactam, capryllactam and laurolactam. The diamine-dicarboxylates include hexamethylenediamine-adipate, hexamethylenediamine-sebacate and hexamethylenediamine-isophthalate. Especially caprolactam, 12-aminododecanoic acid and hexamethylene-diamineadipate can be preferably used.

The poly(alkylene oxide) glycol can be selected from polyethylene glycol, poly(1,2-propylene oxide) glycol, poly(1,3-propylene oxide) glycol, poly(tetramethylene oxide) glycol, poly(hexamethylene oxide) glycol, block or random copolymer of ethylene oxide and propylene oxide, block or random copolymer of ethylene oxide and tetrahydrofuran, etc. Among them, especially polyethylene glycol can be preferably used in view of excellent intrinsically antistatic property. The number average molecular weight of the poly(alkylene oxide) glycol should be 200 to 6,000, preferably 250 to 4,000. If the number average molecular weight is less than 200, the mechanical properties of the polyether ester amide obtained are degraded, and if more than 6,000, the antistatic capability is insufficient.

The dicarboxylic acid should have 4 to 20 carbon atoms and can be selected from aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid and sodium 3-sulfoisophthalate alicyclic dicarboxylic acids such as 1,4-cyclohexanededicarboxylic acid, 1,2-cyclohexanedicarboxylic acid and dicyclohexyl-4,4'-dicarboxylic acid; aliphatic dicarboxylic acid such as succinic acid, oxalic acid, adipic acid, sebacic acid and decanedicarboxylic acid, etc. Especially terephthalic acid, isophthalic acid; 1,4-cyclohexanedicarboxylic acid, sebacic acid, adipic acid and decanedicarboxylic acid can be preferably used in view of polymerizability, color tone and physical properties.

A poly)alkylene oxide) glycol and a dicarboxylic acid react theoretically at a molar ratio of 1:1, but usually, they are supplied at a different ratio, depending on the dicarboxylic acid used.

The polyether ester composed of a poly(alkylene oxide) glycol and a dicarboxylic acid with 4 to 20 carbon atoms is a component unit of the polyether ester amide and is used in the range of 95 to 10 wt %, preferably 80 to 30 wt % based on the weight of the polyether ester amide. A polyether ester content of more than 95 wt % degrades the mechanical properties of the polyether ester amide, and less than 10 wt % degrades the antistatic property of the resin obtained.

(B) Thermoplastic Resin

The thermoplastic resin (B) as the other component of the present invention composition can be a sytrene based resin. It can be selected from polystyrene, rubber modified polystyrene, styreneacrylonitrile, copolymer, styrene-rubbery polymer-acrylonitrile copolymers (ABS resin, AES resin, AAS resin) etc. Two or more of them can also be used. In these resins, the styrene and/or acrylonitrile may be partially substituted by α-methylstyrene, p-methylstyrene, p-t-butylstyrene, (meth)acrylic acid or any of their ester compounds of methyl, ethyl, propyl-n-butyl, etc., unsaturated dicarboxylic acids, unsaturated dicarboxylic anhydrides, maleimide based monomers such as maleimide, N-methylmaleimide and N-phenylmaleimide, and vinyl monomers copolymerizable with styrene such as acrylamide. Especially preferably used styrene based resins are ABS resin, AES resin, AAS resin, MBS resin, etc.

The styrene based resin can preferably contain a graft (co)polymer which is composed of a rubbery polymer, and an aromatic vinyl monomer and/or a (meth)acrylic acid ester monomer, or furthermore a vinyl cyanide monomer.

The rubbery polymer should be preferably lower than 0° C. in glass transition temperature, and can be selected from diene rubbers such as polybutadiene, polystyrene-butadiene and polyacrylonitrile-butadiene, polyisoprene, polychloroprene, acrylic rubbers such as polybutylacrylate, three-ingredient copolymers based on ethylene, propylene and diene, etc.

Especially butadiene and butadiene copolymer are preferable.

The aromatic vinyl monomer can be selected from styrene, α-methylstyrene, vinyltoluene, o-ethylstyrene, o-p-dichlorostyrene, etc. Especially styrene is preferable.

The (meth)acrylic acid ester monomer can be selected from methyl, ethyl, propyl, n-butyl, i-butyl, etc. of acrylic and methacrylic acids. Especially methyl methacrylate is preferable.

The vinyl cyanide monomer can be selected from acrylonitrile, methacrylonitrile, ethacrylonitrile, etc. Especially acrylonitrile is preferable.

As required, other vinyl monomers, for example, maleimide based monomers such as maleimide, N-methylmaleimide and N-phenylmaleimide, acrylamide, etc. can also be used.

The mixture of an aromatic vinyl monomer and/or (meth) acrylic ester monomer and a vinyl cyanide monomer used to prepared the graft (co polymer should consist of 99 to 40 wt %, preferably 90 to 50 wt % of an aromatic vinyl monomer and/or (methy)acrylic acid ester monomer and 1 to 60 wt %, preferably 10 to 50 wt % of a vinyl cyanide monomer.

If the amount of the vinyl cyanide monomer is less than 1 wt %, the effect of enhancing impact resistance by adding the vinyl cyanide monomer cannot be remarkably displayed. If more than 60 wt %, the thermal stability of the graft copolymer is remarkably lowered, to degrade the moldings in color tone unpreferably.

The graft (co)polymer consisting of a rubbery polymer and a monomer or monomer mixture should consist of 1 to 80 parts by weight, preferably 5 to 70 parts by weight of a rubbery polymer and 99 to 20 parts by weight, preferably 95 to 30 parts by weight of a monomer or monomer mixture in total 100 parts by weight of the graft (co)polymer.

If the amount of the rubbery polymer in the graft (co) polymer is less than 1 part by weight, the impact resistance of the resin composition obtained is poor, and if more than 80 parts by weight, the rubbery polymer is defectively dispersed, to impair the appearance of the moldings.

In addition to the graft (co)polymer, the graft(co)polymer-containing composition can further contain another (co) polymer such as styrene-acrylonitrile copolymer, α-methylstyrene-styrene-acrylonitrile copolymer, α-methyl-styrene-methyl methacrylate-acrylonitrile copolymer, α-methylstyrene-acrylonitrile copolymer, styrene-methyl methacrylate-acrylonitrile copolymer, styrene-methyl methacrylate-acrylonitrile copolymer, styrene-methyl methyacrylate copolymer, styrene-N-phenylmaleimide-acrylonitrile copolymer, α-methylstyrene-methyl methacrylate copolymer, polystyrene, polymethyl methacrylate, etc.

Preferable are a (co)polymer consisting of an aromatic vinyl monomer and/or a (meth)acrylic acid ester, a (co) polymer consisting of an aromatic vinyl monomer and/or a (meth)acrylic acid ester monomer and a vinyl cyanide monomer, etc.

Especially a (co)polymer consisting of 100 to 40 wt %, preferably 100 to 50 wt % of an aromatic vinyl monomer and/or a (meth)acrylic acid ester monomer, and 0 to 60 wt %, preferably 0 to 50 wt % of a vinyl cyanide monomer is most preferable.

In the (co)polymer, if the amount of the aromatic vinyl monomer and/or (meth)acrylic acid ester monomer is too small, the affinity with the polyether ester amide becomes poor, and layer exfoliation tends to be caused. Therefore, the amount should be preferably 40 wt % or more.

In the present invention, the graft (co)polymer-containing composition must contain said graft (co)polymer, and if the amount of the rubbery polymer is 1 to 40 wt % in the entire resin composition, it may contain the graft (co)polymer alone.

If the amount of the rubbery polymer is less than 1 wt %, the impact resistance of the resin composition is degraded, and if more than 40 wt %, the composition becomes soft.

(C) Vinyl Copolymer Containing Carboxyl Groups

The resin composition of the present invention may further contain a modified vinyl polymer containing carboxyl groups (hereinafter abbreviated as "modified vinyl polymer"). It is a polymer or copolymer with a structure obtained by polymerizing or copolymerizing one or more vinyl monomers and containing carboxyl groups in the molecule.

The carboxyl groups may be anhydrous carboxyl groups. The carboxyl group content is not especially limited, and can be small or large to such an extent that no degradation is caused in resin performance.

Usually, the effect of the present invention can be efficiently displayed if the modified vinyl polymer substantially contains one or more carboxyl groups on the average in on molecule.

The method for introducing carboxyl groups into the modified vinyl polymer is not especially limited. The introduction can be executed, for example, (1) by copolymerizing a vinyl monomer containing a carboxyl group or anhydrous carboxyl group such as acrylic acid, methyacrylic acid, maleic acid, maleic anhydride, phthalic acid or itaconic acid, with a desired vinyl monomer, or (2) by (co)polymerizing a desired vinyl monomer, using a polymerization initiator with a carboxyl group such as γ,γ'-azobis (γ-cyanovaleric acid), α,α'-(α-cyano) ethyl-p-benzoic acid or succinic acid peroxide and/or a polymerization degree regulating agent such as thioglycollic acid, α-mercaptopropionic acid, β-mercaptopropionic acid, α-mercaptoisobutyric acid or 2,3- or 4-mercaptobenzoic acid, or (3) by saponifying a (co)polymer of a (meth)acrylic acid ester such as methyl methacrylate or butyl acrylate, by an alkali.

The vinyl monomer used to prepare the modified vinyl polymer is not especially limited, and can be one or more selected for each purpose, for example, from aromatic vinyl monomers such as styrene and α-methylstyrene, vinyl cyanide monomers such as acrylonitrile and methacrylonitrile, (meth)acrylic acid ester monomers such as methyl methacrylate and vinyl acrylate, α, β-unsaturated carboxylic acids (anhydrides) such as maleic acid and maleic anhydride, and vinyl monomers such as vinyl chloride, vinyl acetate and butadiene. Especially aromatic vinyl monomers such as styrene, (meth)acrylic acid ester monomers such as methyl methacrylate, maleimide monomers such as N-phenylenemaleimide, and vinyl cyanide monomers such as acrylonitrile can be preferably used, since the resin compositions obtained become excellent in mechanical properties.

The amount of the modified vinyl polymer should be 0.1 to 20 wt %, preferably 1 to 20 wt % based on the weight of the entire composition. If the amount is less than 0.1 wt %, the effect of enhancing impact resistance by the modified vinyl polymer cannot be remarkably displayed. If more than 20 wt %, moldability is considerably lowered, and the moldings lose gloss on the surface.

Organic Halogen Compound

The resin composition of the present invention may further contain an organic halogen compound. This means an organic compound with a halogen atom in the molecule, i.e., being chlorinated or brominated, and publicly known as a flame retardant, and can be concretely selected from low molecular weight organic bromine compounds such as hexabromobenzene, pentabromotoluene, hexabromobisphenyl, decarbromobisphenyl, hexabromocyclodecane, decabromodiphenyl ether, octabromodiphenyl ether, hexabromodiphenyl ether, bis(pentabromophenoxy)ethane, ethylenebis(tetrabromophthalimide) and tetrabromobisphenol A, halogenated polymers and oligomers such as brominated polycarbonates (e.g., polycarbonate oligomer prepared from brominated bisphenol A), brominated epoxy compounds (e.g., diepoxy compound prepared by the reaction between brominated bisphenol A and epichlorohydrin, monoepoxy compound prepared by the reaction between brominated phenol and epochlorohydrin), poly(brominated benzylacrylate), brominated polyphenylene ether, brominated bisphenol A, condensation product of cyanuric chloride and brominated bisphenol, and brominated polystyrene, and their mixtures. Among them, decabromodiphenyl ether, tetrabromobisphenol A, and brominated polycarbonate can be preferably used.

The amount of the organic halogen compound should be preferably 1 to 60 wt %, more preferably 5 to 40 wt % based on the weight of the entire composition. If the amount is less than 1 wt %, flame retardancy is insufficient, and if more than 60 wt %, the physical properties of the composition are considerably lowered.

As desired, the organic halogen compound can be used with an antimony compound such as antimony trioxide. It is also allowed to use zirconium oxide, zinc sulfide, barium sulfate, etc. together with antimony trioxide.

Polyphenylene ether resins

The thermoplastic resin (B) constituting a component of the composition of the present invention composition can alternatively be a polyphenylene ether resin. This refers to a homopolymer or copolymer with the following formula (I) as a unit.

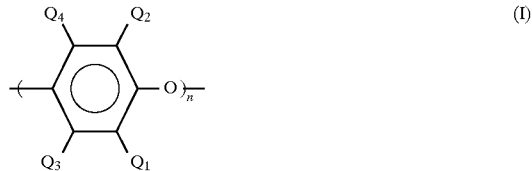

(where $Q_1$, $Q_2$, $Q_3$ and $Q_4$ respectively independently stand for a hydrogen atom, halogen atom, hydrocarbon group, halo hydrocarbon group, hydrocarbon oxy group or halo hydrocarbon oxy group; and n is the repeated number of the monomer unit and stands for an integer of 20 or more).

Furthermore, the polyphenylene ether resin (B) can also be selected from graft polymers obtained by graft-polymerizing an aromatic vinyl monomer to a polyphenylene ether resin.

A polyphenylene ether resin can be prepared by letting a phenol react according to the procedure described in the specification of, for example, U.S. Pat. No. 3,306,874, 3,306,875, 3,257,357 or 3,257,358. The phenol can be selected from 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-6-cyclohexylphenol, 2-methyl-6-tolyphenol, 2-methyl-6-methoxyphenol, 2-methyl-6-butylphenol, 2,6-dimethoxyphenol, 2,3,6-trimethylphenol, 2,3,5,6-tetramethylphenol and 2,6-diethoxyphenol, but is not limited to these.

Any of these may be polymerized to obtain the corresponding homopolymer nor may be copolymerized with another phenol, to prepare the corresponding copolymer with a different unit conforming to the above formula. For example, 2,6-dimethylphenol may be polymerized to make its polymer, i.e., poly(2,6-dimethyl-1-,4-phenylene) ether, or 2,6-dimethyl phenol may be copolymerized with another phenol such as 2,3,6-trimethylphenol or 2-methyl-6-butylphenol, etc., to make the corresponding copolymer such as poly(2,6-dimethyl-2-methyl-6-butyl-1,4-phenylene) ether.

Polycarbonate resins

The thermoplastic resin (B) constituting the present invention composition can further alternatively be a polycarbonate resin. The polycarbonate resin can be an aromatic polycarbonate, aliphatic polycarbonate, or aliphatic-aromatic polycarbonate, etc. In general, it is a homopolymer or copolymer of a bisphenol such as 2,2-bis(4-hydroxyphenyl) alkane, bis(4-hyroxyphenyl) ether or bis(4-hydroxyphenyl) sulfone, sulfide or sulfoxide, or also a polymer of a bisphenol substituted by a halogen atom as required for a specific purpose.

The present invention composition can further contain a hydrotalcite. This is a compound represented by general formula

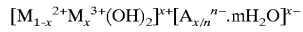

(where $M^{2+}$ stands for a divalent metal such as $Mg^{2+}$, $Mn^{2+}$, $Fe^{2+}$, $Co^{2+}$, $Ni^{2+}$, $Cu^{2+}$ or $Zn^{2+}$; $Mn^{3+}$, a trivalent metal such as $Al^{3+}$, $Cr^{3+}$, $Co^{3+}$ or $In^{3+}$; $A^n$, an n-valent anion such as $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalate ions or salicylate ion; m, the mole number of hydrate; n, charges on anion(s) A; and to a number smaller than 1). Above all, preferable is $Mg_{4.5}Al_2$ (OH)$_{13}$CO$_3$ 3.5H$_2$O and Mg$_{4.5}$Al$_2$(OH)$_{13}$CO$_3$. Hydrotalcite compounds can be synthesized by various methods as described in U.S. Pat. No. 3,539,306.

In general, a synthetic hydrotalcite is produced by coprecipitation of a cationic ingredient solution and an anionic ingredient solution. The most easily available hydrotalcite must be magnesium-aluminium hydroxycarbonate hydrate. A preferable hydrotalcite is magnesium aluminium hydroxycarbonate hydrate available under brand DHT-40 expressed as Mg$_{4.5}$Al$_2$(OH)$_{13}$CO$_3$ 3.5H$_2$O by the manufacturer.

The amount of the hydrotalcite used should be preferably 0.01 to 10 wt %, more preferably 0.1 to 5 wt % based on the entire composition. If the amount is less than 0.01 wt %, mold corrosion is only poorly prevented, and if more than 10 wt %, the physical properties of the composition are considerably and disadvantageously degraded.

The present invention compositions can be molded to prepare housings of optical or magnetic media which can prevent optical or magnetic records from dropping out and sounds and pictures from being disturbed. For example, they can be used for optical disc jackets, video floppies, digital audio cassettes, television remote control case, television game software, video cassettes, video discs and IC cards.

Proportions of compositions of the present invention consist of 1 to 40 wt %, preferably 5 to 30 wt % of a polyether ester amide (A) and 99 to 60 wt %, preferably 95 to 70 wt % of at least one thermoplastic resin (B) selected from the group consisting of styrene based resins, polyphenylene ethers and polycarbonate resins. If the amount of polyether ester amide (A) is less than 1 wt %, the antistatic property of the composition is insufficient, and if more than 40 wt %, the composition becomes soft and degraded in mechanical properties.

The composition of the present invention may be mixed with another thermoplastic resin compatible with it, such as a polyamide, polybutylene terephthalate, polyethylene terephthalate, vinyl chloride resin, or an elastomer like styrene-butadiene block copolymer, to be enhanced in moldability. Furthermore, an antistatic agent such as a metal sulfonate or an anionic, cationic or nonionic surfactant can be added to further enhance the antistatic capability. In addition, as required, various stabilizers such as an antioxidant, ultraviolet ray absorbent, etc., pigment, dye, lubricant, plasticizer, glass fibers, metallic filler, etc. can also be added.

EXAMPLES

The present invention is described more concretely below in reference to present invention examples and comparative examples. The finally obtained resin compositions were injection-molded and tested by the following methods, to measure respective physical properties.

Izod impact strength: ASTM D256-56A

Thermal distortion temperature: ASTM D648 (18.56 kg/cm$^2$ load)

Flexural elastic modulus: ASTM D790

Combustibility: Vertical burning test was executed using a 1/16"×1/2"×5" test piece according to UL94 Code.

MFR: Measured at 220° C. and 10 kg load, using a 2 mm dia.×8 mm nozzle.

Volume resistivity: Measured at room temperature (23° C.) and 50% RH, using a 2 mm t×40 mm dia. disc. For the measurement, super-insulation resistance meter Model SM-10 made by Toa Electronics Ltd. was used.

Prevention of layer exfoliation of molded product: A molded product as a test piece was folded and tensile-tested, and the fracture was observed in reference to the following criterion:

⊚ . . . Very good

○ . . . Good x . . . Molded product caused layer exfoliation.

Appearance of molded product: Appearance was observed in reference to the following criterion:

⊚ . . . Very good

○ . . . Good x . . . Molded product was inferior in surface appearance.

In the following examples, "parts" means "parts by weight" and "%" means "wt %".

Reference Example (1) Preparation of polyether ester amides (A)

A-1: Forty five parts of caprolactam, 51.6 parts of polyethylene glycol having a 2000 number average molecular weight and 4.5 parts of terephthalic acid were put into a reactor with helical ribbon stirring blades, together with 0.2 part of Irganox 1098 (antioxidant) and 0.1 part of antimony trioxide catalyst. With the atmosphere substituted by nitrogen, the mixture as heated and stirred at 240° C. for 60 minutes, to make a transparent homogeneous solution, and polymerization was executed at 260° C. and 0.5 mm Hg or less for 4 hours, to obtain a consistent transparent polymer.

The polymer was discharged like guts onto a cooling belt and pelletized, to prepare a polyether ester amide (A-1) as pellets.

A-2: Operation was executed as done to prepare (A-1), except that 60 parts of nylon of 6.6 salt (AH salt), 33.8 parts of polyethylene glycol of 600 in number average molecular weight and 8.7 parts of adipic acid were used for polymerization for 4 hours, to prepare a polyether ester amide (A-2).

A-3: Operation was executed as done to prepare (A-1), except that 30 parts of ω-aminodecanoic acid, 14.2 parts of decanedicarboxylic acid and 58.6 parts of polyethylene glycol of 1000 in number average molecular weight were used for polymerization for 3 hours, to prepare a polyether ester amide (A-3).

A-4: Operation was executed as done to prepare (A-1), except that 95 parts of ω-aminodecanoic acid, 4.2 parts of polyethylene glycol of 1000 in number average molecular weight and 1.0 part of decanedicarboxylic acid were used, to prepare a polyether ester amide (A-4).

(2) Preparation of graft (co)polymers (B)

B-1: Forty parts of a monomer mixture consisting of 55% of styrene and 45% of methyl methacrylate were emulsion-polymerized in the presence of 60 parts (in terms of solid content) of a polybutadiene latex (rubber grain size 0.25μ, gel content 80%).

The obtained graft copolymer was coagulated by sulfuric acid, neutralized by caustic soda, washed, filtered and dried, to prepare a powdery graft copolymer (B-1).

B-2: Ten parts of Diene NF35A (made by Asahi Kasei Ltd.) were dissolved into 90 parts of styrene, to prepare a graft polymer (B-3) by bulk polymerization.

B-3: Forty parts of a monomer mixture consisting of 70% of styrene and 30% of acrylonitrile were emulsion-polymerized in the presence of 60 parts (in terms of solid content) of the polybutadiene latex used in B-1, to prepare a powdery graft copolymer (B-3) as done to prepare (B-1).

B-4: Sixty parts of a monomer mixture consisting of 72% of methyl methacrylate, 24% of styrene and 4% of acrylonitrile were emulsion-polymerized in the presence of 40 parts (in terms of solid content) of the polybutadiene latex used in B-1, to prepare a powdery graft copolymer (B-4) as done to prepare (B-1).

B-5: Eighty five parts of a monomer mixture consisting of 75% of styrene and 25% of acrylonitrile were emulsion-polymerized in the presence of 15 parts (in terms of solid content) of the polybutadiene used in B-1, to prepare a powdery graft copolymer (B-5) as done to prepare (B-1).

B-6: Fifteen parts of a monomer mixture consisting of 70% of styrene and 30% of acrylonitrile were emulsion-polymerized in the presence of 85 parts (in terms of solid content) of the polybutadiene latex used in B-1, to prepare a powdery graft copolymer (B-6) as done to prepare (B-5).

B-7: CPX-100L (Mitsubishi Gas Chemical Co., Inc.) was used.

B-8: Lexan 121-111 (EPL) was used.

(3) Preparation of (co)polymers (C)

C-1: Fifty five parts of methyl methacrylate and 45 parts of styrene were suspension-polymerized, to prepare a copolymer (C-1).

C-2: Seventy two parts of styrene and 28 parts of acrylonitrile were suspension-polymerized, to prepare a copolymer (C-2).

C-3: Seventy two parts of methyl methacrylate, 24 parts of styrene and 4 parts of acrylonitrile were suspension-polymerized, to prepare a copolymer (C-3).

C-4: Fifty parts of styrene, 30 parts of N-phenylmaleimide and 20 parts of acrylon trile were suspension-polymerized, to prepare a copolymer (C-4).

(4) Preparation of modified vinyl polymers containing carboxyl groups (D)

D-1: Forty five parts of styrene, 50 parts of methyl methacrylate and 5 parts of methacrylic acid were suspension-polymerized, to prepare a modified vinyl polymer (D-1) as beads.

D-2: Seventy parts of styrene, 25 parts of acrylonitrile and 5 parts of methacrylic acid were suspension-polymerized, to prepare a modified vinyl polymer (D-2) as beads.

D-3: Seventy parts of methyl methacrylate, 24 parts of styrene, 4 parts of acrylonitrile and 2 parts of acrylic acid were suspension-polymerized, to prepare a modified vinyl polymer (D-3) as beads.

D-4: Ninety parts of styrene and 10 parts of methacrylic acid were suspension-polymerized, to prepare a modified vinyl polymer (D-4) as beads.

D-5: Ninety parts of styrene and 10 parts of maleic anhydride were mixed in a solution, and the solvent was removed, to prepare a modified vinyl polymer (D-5).

Examples 1 to 15

The polyether ester amides (A), thermoplastic resins (B) and/or modified vinyl polymers (D) prepared in the Reference Examples were mixed at ratios listed in Table 1, molten, kneaded and extruded at a resin temperature of 200° C. by a vented 40 mm dia. extruder, to prepare pellets.

For the comparative thermoplastic resins (B) containing a polyphenylene ether resin and a polycarbonate resin, the other ingredients than the polyphenylene ether resin and polycarbonate resin were mixed, and molten, kneaded and extruded at a resin temperature of 200° C., to prepare pellets, and the pellets were mixed with the polyphenylene ether resin or polycarbonate resin. The mixtures were the molten, kneaded and extruded at any resin temperature of 240 to 260° C., to prepare pellets. They were molded to prepare desired test pieces by an injection molding machine.

The volume resistivity values were measured using 2 mm thick discs under the following conditions:

(1) Immediately after completion of molding, the test piece was sufficiently washed with distilled water, had the water on the surface removed, allowed to stand at 50% RH and 23° C. for 24 hours.

(2) After completion of molding, the test piece was allowed to stand at 50% RH and 23° C. for 200 days, washed sufficiently with distilled water, had the water on the surface removed and allowed to stand at 50% RH and 23° C. for 24 hours, and measured.

Physical properties of the resin compositions were also measured, and the results are listed in Table 2. Properties as housings of recording media were also evaluated, and the results are listed in Table 3.

Examples 1 to 8

The polyether ester amides (A) and thermoplastic resins (B) and/or modified vinyl polymers (D) prepared in the Reference Example were mixed at ratios listed in Table 1, and the physical properties of the respective resin compositions were measured as done in Example 1. The results are listed in Table 2. The properties as housings of recording media were also evaluated, and the results are listed in Table 3.

What is claimed is:

1. An intrinsically antistatic resin composition consisting essentially of (A) 5 to 40% of a polyether ester amide, (B) 95 to 60 weight % of a thermoplastic resin selected from the group consisting of styrene-based resins which are free of carboxyl groups and polycarbonate resins, (C) 0.1 to 20 weight % of a vinyl polymer containing carboxyl groups and (D) 1 to 60 weight % of an organic halogen compound, said weight % being based on the weight of the entire composition.

2. The composition defined in claim 1 wherein said organic halogen compound (D) contains a halogen atom selected from the group consisting of fluorine and bromine.

3. The composition defined in claim 1 wherein said organic halogen compound (D) is selected from the group consisting of low molecular weight organic bromine compounds and halogenated polymers and oligomers.

4. The composition defined in claim 3 wherein said low molecular weight organic bromine compounds are selected from the group consisting of hexabromobenzene, pentabromotoluene, hexabromobisphenyl, decabromobisphenyl, hexabromocyclodecane, decabromodiphenyl ether, octabromodiphenyl ether, hexabromodiphenyl ether, bis(pentabromophenoxy)ethane, ethylenebis(tetrabromophthalimide) and tetrabromobisphenol A.

5. The composition defined in claim 3 wherein the halogenated polymers and oligomers are selected from the group consisting of brominated polycarbonates, brominated epoxy compounds, brominated polyphenylene ether, brominated bisphenol A, condensation products of cyanuric chloride and brominated bisphenol, brominated polystyrene and mixtures thereof.

6. The composition as defined in claim 1, wherein said composition has a volume resistivity of $7 \times 10^{10} - 1 \times 10^{12} \Omega$ cm.

7. An intrinsically antistatic resin composition defined in claim 1, wherein said polyether ester amide is formed from i) an aminocarboxylic acid having six or more carbon atoms or a lactam or a diamine-dicarboxylate having six or more carbon atoms, ii) a polyethylene glycol of 200 to 6,000 in number average molecular weight and iii) a dicarboxylic acid with 4 to 20 carbon atoms, with components ii) and iii) accounting for 95 to 10 weight % wherein said composition has a volume resistivity of $7 \times 10^{10} - 1 \times 10^{12} \Omega$ cm.

8. A housing for optical or magnetic recording media comprising a molded structure prepared by molding an intrinsically antistatic resin composition consisting essentially of (A) 5 to 40 weight % of a polyether ester amide, (B) 95 to 60 weight % of a thermoplastic resin selected from the group consisting of styrene-based resins which are free of carboxyl groups and polycarbonate resins, (C) 0.1 to 20 weight % of a vinyl polymer containing carboxyl groups and (D) 1 to 60 weight % of an organic halogen compound, said weight % being based on the weight of the entire housing.

9. The composition defined in claim 8 wherein said organic halogen compound (D) contains a halogen atom selected from the group consisting of fluorine and bromine.

10. The composition defined in claim 8 wherein said organic halogen compound (D) is selected from the group consisting of low molecular weight organic bromine compounds and halogenated polymers and oligomers.

11. The composition defined in claim 10 wherein said low molecular weight organic bromine compounds are selected from the group consisting of hexabromobenzene, pentabromotoluene, hexabromobisphenyl, decabromobisphenyl, hexabromocyclodecane, decabromodiphenyl ether, octabromodiphenyl ether, hexabromodiphenyl ether, bis(pentabromophenoxy)ethane, ethylenebis (tetrabromophthalimide) and tetrabromobisphenol A.

12. The composition defined in claim 10 wherein the halogenated polymers and oligomers are selected from the group consisting of brominated polycarbonates, brominated epoxy compounds, brominated polyphenylene ether, brominated bisphenol A, condensation products of cyanuric chloride and brominated bisphenol, brominated polystyrene and mixtures thereof.

13. The composition as defined in claim 8, wherein said composition has a volume resistivity of $7 \times 10^{10} - 1 \times 10^{12} \Omega$ cm.

* * * * *

UNITED STATES PATENT AND TRADEMARK OFFICE
CERTIFICATE OF CORRECTION

PATENT NO.    : 5,886,097
DATED         : March 23, 1999
INVENTOR(S)   : Tadao Fukumoto et al.

Page 1 of 4

It is certified that error appears in the above-identified patent and that said Letters Patent is hereby corrected as shown below:

Column 10,
After line 32 and before line 33, please insert the following Tables 1, 2 and 3:

UNITED STATES PATENT AND TRADEMARK OFFICE
CERTIFICATE OF CORRECTION

PATENT NO. : 5,886,097
DATED : March 23, 1999
INVENTOR(S) : Tadao Fukumoto et al.

It is certified that error appears in the above-identified patent and that said Letters Patent is hereby corrected as shown below:

TABLE 1

| | Polyether ester amide (A) | | Thermoplastic resin (B) | | Resin Composition | | | |
| | | | | | Modified Vinyl polymer (D) | | Hydrotalcite DHT-4A-2 | PD-1391 |
| | | Name | Parts | Name | Parts | Name | Parts | Parts | Parts |
|---|---|---|---|---|---|---|---|---|---|
| Example 1 | (Comparative) | A-1 | 15 | B-1/C-1 | 20/65 | — | — | — | — |
| Example 2 | | A-1 | 15 | B-1/C-1 | 20/60 | D-1 | 5 | 0.5 | 0.2 |
| Example 3 | | A-1 | 15 | B-3/C-2 | 20/60 | D-2 | 5 | 0.5 | 0.2 |
| Example 4 | | A-1 | 15 | B-2 | 8.0 | D-4 | 5 | 0.5 | 0.5 |
| Example 5 | (Comparative) | A-2 | 30 | B-5 | 55 | D-2 | 15 | 1-0 | 0.5 |
| Example 6 | | A-1 | 15 | B-4/C-3 | 65/15 | D-3 | 5 | — | 0.5 |
| Example 7 | | A-3 | 10 | B-3/C-2/C-4 | 24/41/20 | D-2 | 5 | 0.5 | DBS 0.2 |
| Example 8 | | A-3 | 15 | B-3/C-2 | 20/60 | D-2 | 5 | 0.5 | DBS 0.2 |
| Example 9 | | A-1 | 15 | B-3/C-2 | 25/50 | D-2 | 10 | 2.0 | DBS 0.2 |
| Example 10 | | A-1 | 15 | B-7/B-2 | 40/40 | D-4 | 5 | AO-20 0.3 | — |
| Example 11 | | A-2 | 15 | B-7/B-2 | 40/40 | D-5 | 5 | AO-20 0.3 | — |
| Example 12 | | A-1 | 15 | B-7/B-3/C-2 | 30/15/30 | D-2 | 5 | AO-20 0.3 | — |
| Example 13 | | A-1 | 15 | B-8/B-3/C-2 | 50/15/15 | D-2 | 5 | AO-20 0.3 | — |
| Example 14 | | A-1 | 15 | B-8/B-5 | 30/50 | D-2 | 5 | AO-20 0.3 | DBS 0.1 |
| Example 15 | | A-1 | 15 | B-8/B-3 | 70/10 | D-2 | 5 | AO-20 0.3 | — |
| Comparative example 1 | | A-1 | 0.5 | B-3/C-2 | 20/79.5 | — | — | — | — |
| Comparative example 2 | | A-1 | 50 | B-3/C-2 | 20/15 | D-2 | 15 | 0.5 | 0.5 |

| | Flame retarder | | Flame regarding | Robbery polymer content in resin composition wt % |
| | FR-30 Parts | Chlorinated polyethylene Parts | auxiliary $Sb_2O_3$ Parts | |
|---|---|---|---|---|
| Example 1 | — | — | — | 12.0 |
| Example 2 | — | — | — | 11.9 |
| Example 3 | — | — | — | 10.1 |
| Example 4 | — | — | — | 8.4 |
| Example 5 | — | — | — | 8.1 |
| Example 6 | — | — | — | 25.9 |
| Example 7 | — | — | — | 14.3 |
| Example 8 | 13 | — | 4 | 10.2 |
| Example 9 | 25 | 5 | 7 | 10.8 |
| Example 10 | — | — | — | 4.0 |
| Example 11 | — | — | — | 4.0 |
| Example 12 | — | — | — | 9.0 |
| Example 13 | — | — | — | 9.0 |
| Example 14 | — | — | — | 7.5 |
| Example 15 | — | — | — | 6.0 |
| Comparative example 1 | — | — | — | 12.0 |
| Comparative example 2 | — | — | — | 11.9 |

Hydrotalcite DHT-4A-2: Mg 4.5 $Al_2$ $(OH)_{13}CO_3$ (KYOWA CHEMICAL INDUSTRY CO. LTD.)
PB-1392: N.N Dihydroxy ethyl stearylamine (MARUBISHI PETROCHEMICAL CO., LTD).)
DBS: Sodium dodecyl benzene sulfonate (KOA CORPORATION)
FR-30: Brominated polycarbonate (MITSUBISHI GAS CHEMICAL CO., INC.)
AO-20: 1,3,5-tris(3,5-di-t-butyl-4-hydroxy-benzyl)-S-triazine-2,4-6-(1K, 3H, trione (AKEDA ARGUS CHEMICAL CO., LTD.)

UNITED STATES PATENT AND TRADEMARK OFFICE
CERTIFICATE OF CORRECTION

PATENT NO. : 5,886,097
DATED : March 23, 1999
INVENTOR(S) : Tadao Fukumoto et al.

It is certified that error appears in the above-identified patent and that said Letters Patent is hereby corrected as shown below:

TABLE 2

| | | Physical Properties | | | |
|---|---|---|---|---|---|
| | | Izod Impact (kg · cm/cm · notch) | Fluxural elastic modulus (kg/cm$^2$) | thermal deformation temperature (18.56 kg/cm$^2$ load) °C. | MFR 220° C. (g/l min) |
| Example 1 | (comparative) | 13 | 21500 | 91 | 25 |
| Example 2 | | 18 | 21200 | 90 | 20 |
| Example 3 | | 22 | 21000 | 90 | 22 |
| Example 4 | | 10 | 19800 | 87 | 28 |
| Example 5 | (comparative) | 25 | 18800 | 81 | 18 |
| Example 6 | | 20 | 19100 | 86 | 6 |
| Example 7 | | 15 | 21000 | 100 | 14 |
| Example 8 | | 15 | 21100 | 90 | 25 |
| Example 9 | | 10 | 19800 | 80 | 20 |
| Example 10 | | 11 | 22300 | 119 | (240° C.) 8 |
| Example 11 | | 9 | 22000 | 121 | (240° C.) 8 |
| Example 12 | | 12 | 21400 | 108 | (240° C.) 17 |
| Example 13 | | 22 | 21500 | 110 | (240° C.) 146 |
| Example 14 | | 19 | 21100 | 102 | (240° C.) 171 |
| Example 15 | | 25 | 22200 | 120 | (240° C.) 83 |
| Comparative example 1 | | 15 | 25100 | 91 | 20 |
| Comparative example 2 | | 24 | 13300 | 59 | 9 |

| | Volume resistivity | | Molded Product | | |
|---|---|---|---|---|---|
| | Immediately after molding (Ω cm) | After being allowed to stand for 200 days (Ω cm) | Prevention of layer exfoliation | Appearance | Combustibility UL 94 code |
| Example 1 | 3 × 10$^{10}$ | 2 × 10$^{10}$ | ○ | ◉ | — |
| Example 2 | 7 × 10$^{10}$ | 6 × 10$^{10}$ | ◉ | ◉ | — |
| Example 3 | 7 × 10$^{10}$ | 5 × 10$^{10}$ | ◉ | ◉ | — |
| Example 4 | 1 × 10$^{11}$ | 8 × 10$^{10}$ | ◉ | ◉ | — |
| Example 5 | 6 × 10$^{8}$ | 6 × 10$^{8}$ | ○ | ○ | — |
| Example 6 | 6 × 10$^{10}$ | 5 × 10$^{10}$ | ◉ | ◉ | — |
| Example 7 | 1 × 10$^{12}$ | 8 × 10$^{11}$ | ◉ | ◉ | — |
| Example 8 | 8 × 10$^{11}$ | 7 × 10$^{11}$ | ◉ | ◉ | 1/16" V-2 |
| Example 9 | 1 × 10$^{12}$ | 7 × 10$^{11}$ | ◉ | ◉ | 1/16" V-0 |
| Example 10 | 8 × 10$^{10}$ | 7 × 10$^{10}$ | ◉ | ◉ | — |
| Example 11 | 7 × 10$^{10}$ | 7 × 10$^{10}$ | ○ | ◉ | — |
| Example 12 | 7 × 10$^{10}$ | 5 × 10$^{10}$ | ◉ | ◉ | — |
| Example 13 | 9 × 10$^{10}$ | 8 × 10$^{10}$ | ◉ | ◉ | — |
| Example 14 | 7 × 10$^{11}$ | 6 × 10$^{11}$ | ◉ | ◉ | — |
| Example 15 | 4 × 10$^{11}$ | 1 × 10$^{11}$ | ○ | ◉ | — |
| Comparative example 1 | 1 × 10$^{16}$ | 1 × 10$^{11}$6 | ◉ | ◉ | — |
| Comparative example 2 | 3 × 10$^{8}$ | 1 × 10$^{8}$ | X | ○ | — |

MFR: Melt flow rate

UNITED STATES PATENT AND TRADEMARK OFFICE
CERTIFICATE OF CORRECTION

PATENT NO. : 5,886,097
DATED : March 23, 1999
INVENTOR(S) : Tadao Fukumoto et al.

It is certified that error appears in the above-identified patent and that said Letters Patent is hereby corrected as shown below:

TABLE 3

| | Resin composition used | Molded product Name | Appearance | Specific Gravity | Noise Prevention | cost | Others |
|---|---|---|---|---|---|---|---|
| Example 1 | Example 3 | VTR cassette | ⊚ | 1.0 | ⊚ | ⊚ | — |
| Example 2 | Example 4 | VTR cassette | O | 1.0 | ⊚ | ⊚ | — |
| Example 3 | Example 3 | Television gun (case for remote control) | ⊚ | 1.0 | ⊚ | ⊚ | |
| Example 4 | Example 2 | IC card | ⊚ | 1.0 | ⊚ | ⊚ | |
| Example 5 | Example 1 | Television game software case | ⊚ | 1.0 | ⊚ | ⊚ | |
| Example 6 | Example 4 | Video floppy | O | 1.0 | ⊚ | ⊚ | |
| Example 7 | Example 9 | IT card case | ⊚ | 1.1 | ⊚ | ⊚ | |
| Example 8 | Example 13 | VHD case | ⊚ | 1.1 | ⊚ | O | |
| Example 9 | Example 7 | Optical disc jacket | ⊚ | 1.0 | ⊚ | ⊚ | |
| Comparative product Example 1 | Comparative example 1 | IC card | ⊚ | 1.0 | ⊚ | ⊚ | |
| Comparative product Example 2 | Comparative example 2 | VHD case | O | 1.0 | ⊚ | O | Low rigidity |
| Comparative product Example 3 | Comparative example 3 | VTR cassette | X Irregular gloss generated | 1.0 | ⊚ | ⊚ | Low impact resistance |
| Comparative product Example 4 | Comparative example 4 | Optical disc jacket | X Flow mark generated | 1.0 | ⊚ | ⊚ | Low rigidity |
| Comparative product Example 5 | Comparative example 6 | Television gun | X Cloudiness generated | 1.0 | ⊚ | ⊚ | |
| Comparative product Example 6 | Comparative example 5 | VTR cassette | X Cloudiness generated | 1.0 | ⊚ | ⊚ | |
| Comparative product Example 7 | Comparative example 8 | VHD case | ⊚ | 1.0 | ⊚ | ⊚ | Low impact resistance |

Note:
Criteria
Appearance ... ⊚: Very good O: Good X: Very poor
Cost (though rough) ... ⊚: About the same as the cost of polycarbonate
O: Within twice the cost of polycarbonate
X: More than twice the cost of polycarbonate
Noise prevention which corresponds to volume resistivity ...
⊚: $1 \times 10^{12}$ Ω cm or less
O: $2 \times 10^{12}$ to $5 \times 10^{13}$ Ω cm
X: $6 \times 10^{13}$ Ω cm or more Signed and Sealed this Twenty-third Day of October, 2001

Attest:

*Nicholas P. Godici*

NICHOLAS P. GODICI
*Attesting Officer*    *Acting Director of the United States Patent and Trademark Office*